(12) United States Patent
Krauss

(10) Patent No.: US 8,104,022 B2
(45) Date of Patent: Jan. 24, 2012

(54) AUTOMATED METHOD FOR HISTORICAL ANALYSIS OF A MEMORY STATE

(75) Inventor: Kirk J. Krauss, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 1421 days.

(21) Appl. No.: 11/556,715

(22) Filed: Nov. 6, 2006

(65) Prior Publication Data

US 2008/0109469 A1    May 8, 2008

(51) Int. Cl.
*G06F 9/44* (2006.01)
(52) U.S. Cl. ......................... 717/127; 717/131
(58) Field of Classification Search .................. None
See application file for complete search history.

(56) References Cited

U.S. PATENT DOCUMENTS

| | | | |
|---|---|---|---|
| 5,408,650 A | 4/1995 | Arsenault | |
| 5,428,618 A | 6/1995 | Ueki et al. | |
| 5,845,125 A | 12/1998 | Nishimura et al. | |
| 6,003,143 A * | 12/1999 | Kim et al. | 714/38.13 |
| 6,212,653 B1 | 4/2001 | Boivin et al. | |
| 6,327,699 B1 * | 12/2001 | Larus et al. | 717/128 |
| 6,345,383 B1 | 2/2002 | Ueki | |
| 6,353,924 B1 | 3/2002 | Ayers et al. | |
| 6,904,594 B1 * | 6/2005 | Berry et al. | 718/100 |
| 6,951,011 B1 | 9/2005 | Sexton | |
| 2005/0273757 A1 * | 12/2005 | Anderson | 717/100 |

FOREIGN PATENT DOCUMENTS

EP    0359254    3/1990

OTHER PUBLICATIONS

"An Execution Backtracking Approach to Program Debugging" by Hiralal Agrawal, Richard DeMillo, and Eugene Spafford published 2004.*
Agrawal, Hiralal; Demillo, Richard; Spafford, Eugene. "Debugging with Dynamic Slicing and Backtracking." Copyright 1993.*
De Sutter, Bjorn; De Bus, Bruno; Ronsse, Michiel; De Bosschere, Koen. "Backtracking and Dynamic Patching for Free." Copyright 2005.*
Richard A. DeMillo and Eugene H. Spafford, Debugging with Dynamic Slicing and Backtracking, Hiralal Agrawal Bellcore, pp. 1-29.

* cited by examiner

*Primary Examiner* — Wei Zhen
*Assistant Examiner* — Adam R Banes
(74) *Attorney, Agent, or Firm* — Cantor Colburn LLP; Daniel McLoughlin

(57) ABSTRACT

An automated method for historical analysis of a memory state includes tracking all memory write accesses by an application under test; recording a directed graph having values in a plurality of memory locations, such values being derived from values previously stored in at least one of, (i) the same memory location, and (ii) another memory location, each memory location being updated by a computer operation occurring at a verifiable time; displaying a portion of the graph that led to the update of a user-specified memory location by the application under test; and traversing backward from any node located on the directed graph via an arc utilized to follow the path of events that led to the content of the memory location represented by that node at the time represented by that node.

6 Claims, 3 Drawing Sheets

TIME

AUTOMATED METHOD FOR HISTORICAL ANALYSIS OF A MEMORY STATE

TRADEMARKS

IDM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of Invention

This invention relates in general to software, and more particularly, to software debugging.

2. Description of Background

A common and often challenging problem in software debugging is backtracking to understand how the system has arrived at a particularly state. This is generally not the first step in the debugging process. First, particularly for complex programs, a lot of study is sometimes needed just to understand what the system's state is when misbehavior becomes apparent. The result of this study is called setting a good breakpoint. The real challenge comes after this step, when one must next understand how the system has come to be in this misbehaving state. There's often no clear way to identify relevant breakpoints that will trigger before there's any apparent misbehavior. Software developers may spend hours or days, using hit-or-miss techniques, to pin down the entire chain of events leading up to the misbehavior they are trying to debug.

A host of development tools is marketed to help circumvent or address this breaktracking challenge. Some tools point our programmatic errors or race conditions that can lead to certain classes of problems, but none of these tools will identify every sort of problem so that it can be circumvented. Other tools capture total state information throughout the run, but such tools must record an overwhelming amount of state data, making them inadvisable for some complex programs. Developers often simply log selected program state data, but the data logging mechanism must be developed, and appropriate data must be selected for logging. Deploying any of the foregoing tools or techniques in the field may result in customer frustration if the source of the problem is not readily diagnosed that way.

Thus, there is a need for partial program state capture that does not require stepping backward in the debugging.

SUMMARY OF THE INVENTION

The shortcomings of the prior art are overcome and additional advantages are provided through the provision of an automated method for historical analysis of a memory state. The method includes tracking all memory write accesses by an application under test; recording a directed graph having values in a plurality of memory locations, such values being derived from values previously stored in at least one of, (i) the same memory location, and (ii) another memory location, each memory location being updated by a computer operation occurring at a verifiable time; displaying a portion of the graph that led to the update of a user-specified memory location by the application under test; and traversing backward from any node located on the directed graph via an arc utilized to follow the path of events that led to the content of the memory location represented by that node at the time represented by that node, displaying the arc so that one end of the displayed arc ends at the node representing the user-specified first memory location and the other end of the displayed arc ends at another node representing a second memory location whose value was utilized during the computation of the value presently stored in the user-specified memory location; wherein the node representing the second memory location is expandable to reveal information about how data was acquired and redistributed from the second memory location to the first memory location; wherein when each memory location is updated a core data structure is allocated and utilized to represent the update, wherein the core data structure includes (i) the memory address being updated, (ii) an instruction pointer for the code that is updating that address, (iii) a pointer to a previous memory update structure representing a recursor to this update, (iiii) a second pointer to a previous update structure in case the date involves two values reviouslv stored in memory, (iv) a time stamp, and (v) a link to the structure representing the update that has occurred immediately prior to this update in time.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution for an automated method for historical analysis of a memory state.

BRIEF DESCRIPTION OF THE DRAWINGS

The subject regarded as the invention is particularly pointed out and distinctly claimed in the claims at the conclusion of the specification. The foregoing and other objects, features, and advantages of the invention are apparent from the following detailed description taken in conjunction with the accompanying drawing in which:

The detailed description explains an exemplary embodiments of the invention, together with advantages and features, by way of example with reference to the drawings.

One skilled in the art should know that the various functions described herein maybe implemented with a software runtime analysis tool. In the exemplary embodiment, for example, the various functions described herein maybe implemented as part of a tool that analyzes a software application under test. In another embodiment the various functions described herein may alternatively be implemented as part of the software application under test.

DETAILED DESCRIPTION OF THE INVENTION

Figure 1:
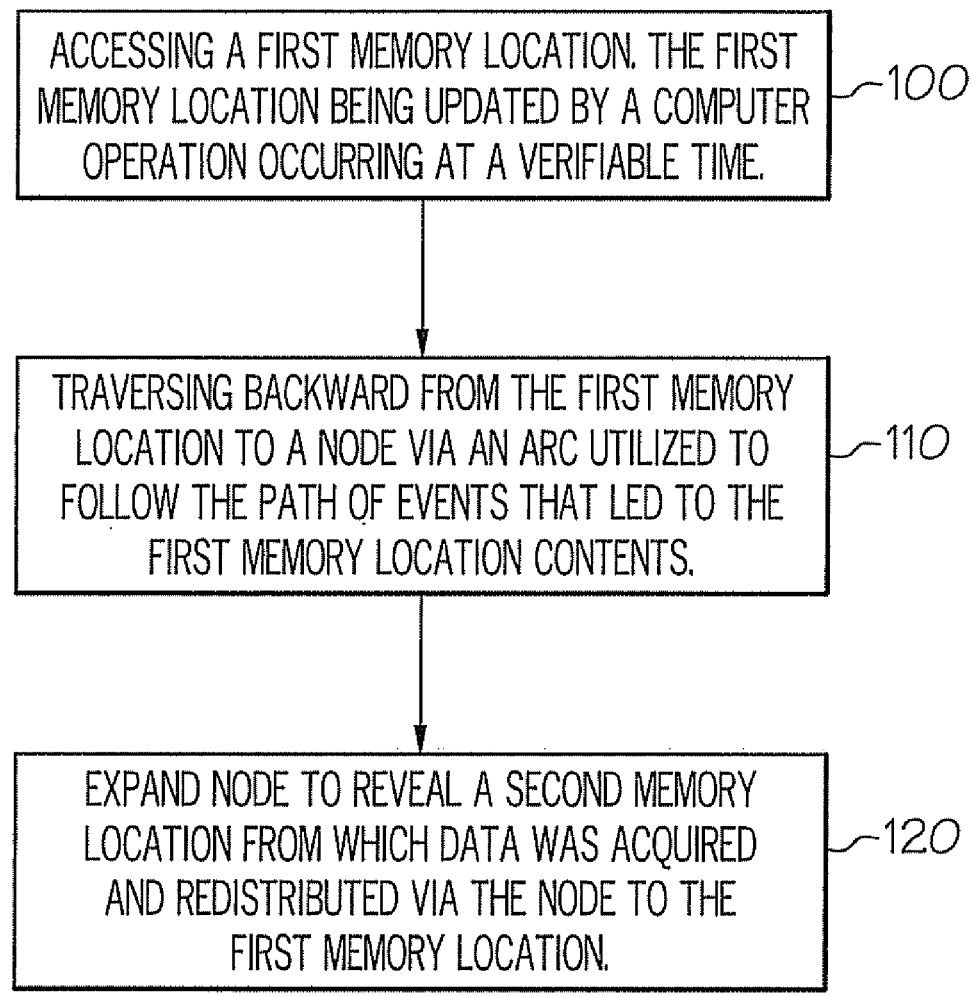
FIG. 1 illustrates one example of an automated method for historical analysis of a memory state.

Referring to FIG. 1, an automated method for historical analysis of a memory state is shown. At step 100, all memory accesses are tracked by an application under test.

Figure 2:
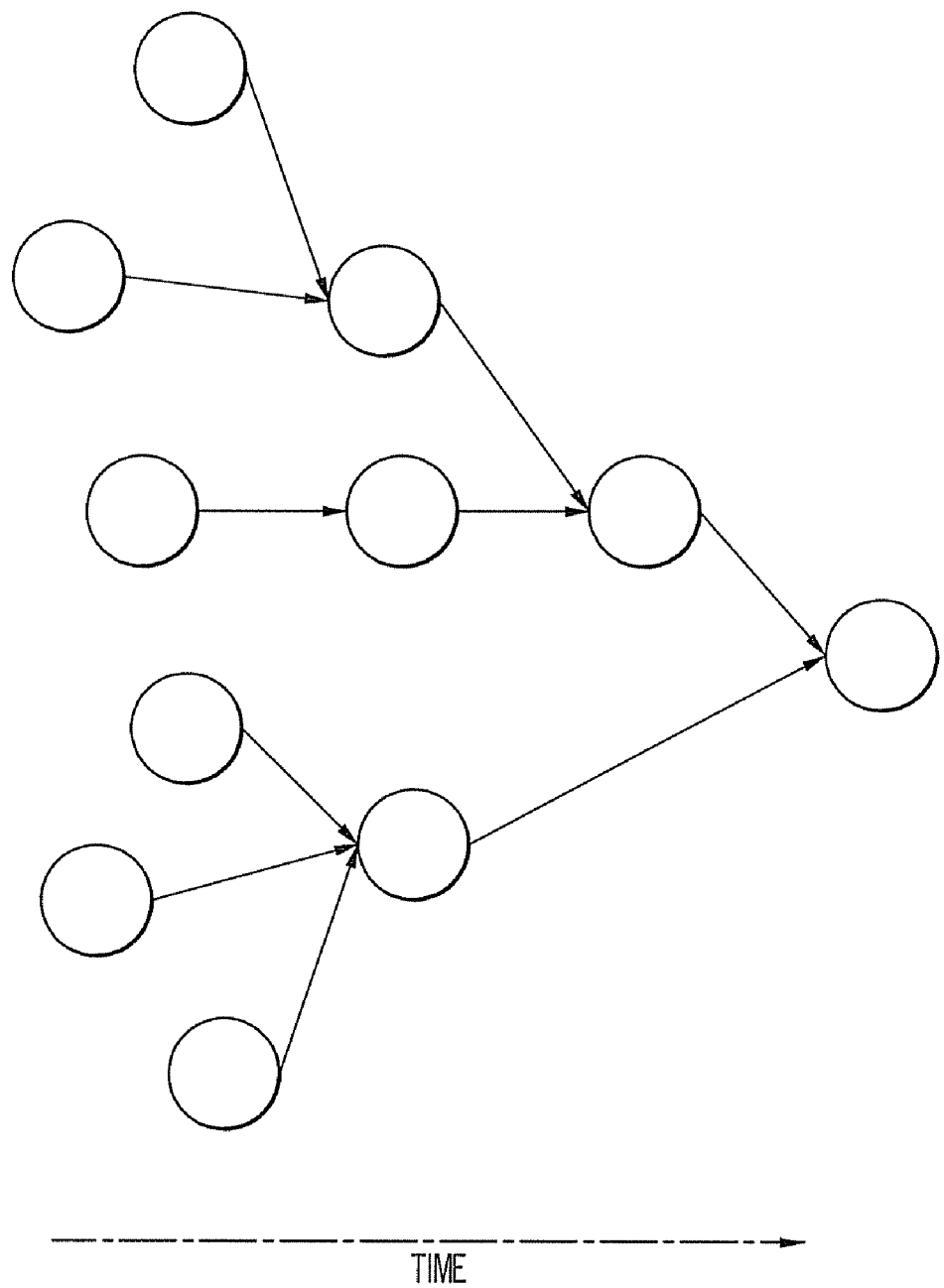
FIG. 2 illustrates one example of a plurality of nodes associated with the automated method for historical analysis of a memory state shown in FIG. 1.

Referring to FIG. 2, a plurality of nodes is shown. Each node represents a memory location at particular time and there is one node per memory update.

At step 110, a directed graph having values in a plurality of memory locations is recorded. The values are derived from values that have been previously stored in at least one of, (i) the same memory location, and (ii) another memory location. Each memory location being updated by a computer operation occurring at a verifiable time.

At step 120, a portion of the graph that led to the update of a user specified memory location by the application under test is displayed.

At step 130, a backward traversal occurs from any node located on the directed graph via an utilized to follow the path of events that led to the content of the memory location represented by that node at the time represented by the node.

One end of a first displayed arc ends at the node representing the user-specified first memory location and the other end of the first displayed arc ends at another node representing a second memory location whose value was utilized during the computation of the value presently stored in the user-specified memory location. The node representing the first memory location is expandable to reveal the information about how data was acquired and redistributed from the second memory location to the first memory location.

Each node is further expandable to reveal the call chain and the executed computer instruction that led to the update of the memory location associated with that node. The call chain is a plurality of linked stackframes, and the stackframe is a data structure that represents a position in a call graph. One stackframe data structure will be recorded the first time the application under test enters a particular function may be updated each time the application under test re-enters that function, if the call chain leading to that re-entry is the same. The stackframe data structures will form a directed graph representing the set of relationships between the caller and callee functions during the run of the application under test. A call graph maybe represented by a set of nodes, with two pointers being associated with each node.

One pointer shall serve as a link between each function and the function's next descendent function in the call graph. The other pointer will serve as a link between each function and the function's next sibling function. Each stackframe structure may also contain timestamps for the purpose of validating the respective stackframe's associated with a particular node in a set of update structures. One familiar with the art should know that call graphs maybe recorded in a variety of ways. The foregoing description of the recording of a call graph is meant to be illustrative as an example, and not limiting because alternative embodiments of the disclosure may vary for recording the call graph or for recording the call chains associated with each node in the directed graph of memory updates.

A history memory update maybe represented as a directed graph, the directed graph being different than the call graph. At one end of the graph we have the current memory content at our good breakpoint. Choosing a particular memory location (m1), the user may desire to be able to follow the path of events that has led that memory location to have its current content. Each arc of the graph would then represent a step along that path.

Figure 3:
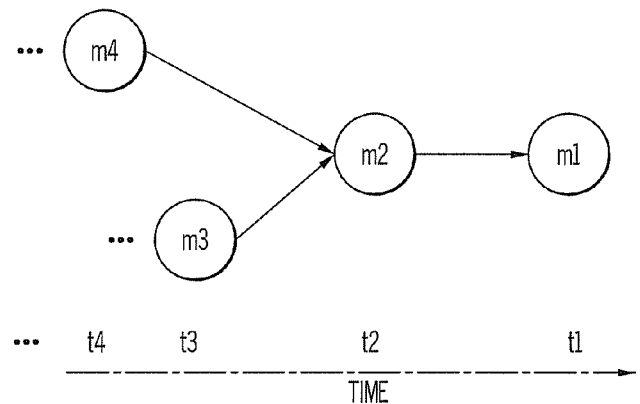
FIG. 3 illustrates one example of a graphical representation of the plurality of nodes shown in FIG. 2.

Referring to FIG. 3, a graphical representation of a set of nodes utilized in the following example is shown. For example and not meant to be limiting, if the memory location (m1) was last updated by a simple copy operation, at time (t1), then the other side of the arc would end at a node that could be expanded to reveal the memory location (m2) from which the data was copied, along with the call chain and instruction at which that copy occurred. From there, the user might follow a subsequent arc that takes the user further backward into the history of the memory location (m2) that served as the source of copy. To continue the example, if this memory location (m2) was updated, at time (t2), by an operation that added two values that had earlier been stored in two separate memory locations (m3 and m4), then the user might follow either of these two arcs that represent those two memory locations at still earlier times (t3 and t4). Following those arcs further back, the user might learn something about how those memory locations came to contain those respective values at those times. In this example, earlier times are represented with higher number—that is, t3 was earlier than t1. This was solely an illustration, and in fact actual time stamps may be shown that are successively earlier as the user travels backward along the described arcs.

Figure 4:
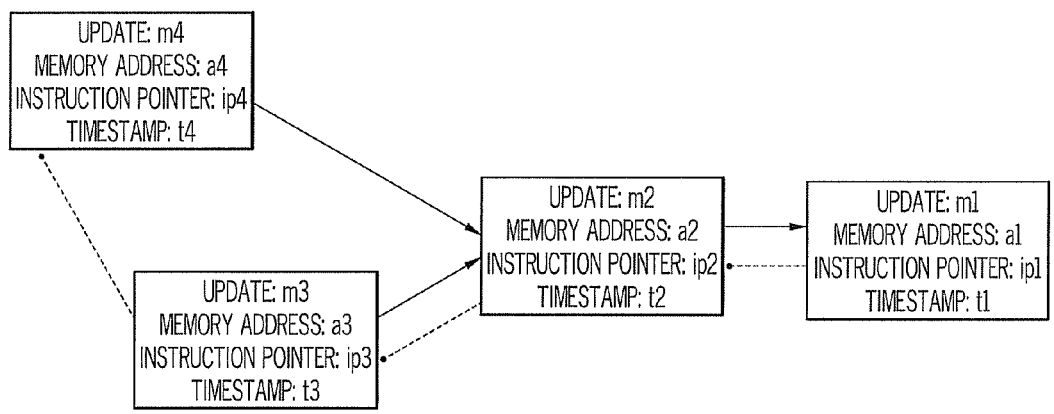
FIG. 4 illustrates one example of a directed graph that reveals the associated memory locations of the nodes shown in FIG. 3.

Referring to FIG. 4, a directed graph of FIG. 3 is shown. The directed graph of FIG. 4 reveals the associated memory location of each node. The dotted connections between the nodes indicated the first-in-first-out (FIFO) queuing arrangement provided for eventual deallocation of the structures as described in the following paragraph. The user may traverse backward from the node representing a user specified first memory location to a second node representing a second memory location via another arc. One end of the arc ends at the user-specified node and the other end of the arc ends at the node representing the second memory location, such that the traversal reveals historical data about the user-specified memory location. The second memory location is updated by a computer operation occurring at a verifiable time earlier than that associated with the user-specified node. The user may optionally traverse further backward from the node representing the second memory location to nodes representing third and fourth memory locations at still earlier times, to reveal historical data about the second memory location.

An additional core data structure besides the stackframe structure, shall be allocated at each memory update to represent the update itself. The core data structure includes (i) the memory address being updated; (ii) an instruction pointer for the code that is updating tat address; (iii) a pointer to a previous memory update structure representing a precursor to this update; (iiii) a second pointer to a previous update structure in case the update involves two values previously stored in memory; (iv) a time stamp; and (v) a link to the structure representing the update that has occurred immediately prior to this update in time. The reason for such a link would be to allow purging of old updates as less storage space for these structures becomes available. This suggested link will allow these structures to be deallocated in first-in-first-out (FIFO) fashion, so the application under test may run indefinitely. Each node in the displayed directed graph shall be associated with a unique update structure.

A difficulty in deallocating these structures is that there are pointers to then in newer update structures. If these structures are allocated in heap memory that's not used for storage of any other data, and if they are zero'd out when they are deallocated, then a time stamp reasonability check should be enough to ensure data consistency when these structures are traversed.

When a memory location is updated, a first previous pointer to an update structure in the stored directed graph will be all that'needed to represent the situation where the update is a straightforward copy or a hard-coded value that'written out to memory. A second previous pointer to a second update structure will be useful for more complex updates, such as two-operator arithmetic operations. If there is a relatively rare need for three or more operator updates to be recorded, these could be represented by two linked updates with a common time stamp. If that turns out to be a frequent need, more previous pointers in this structure may be appropriate.

Some overhead-saving measure may be utilized in embodiments of the invention. For example, if a large block of memory is updated via a memory copy, this may be represented using one or two update structures. An additional field in the structure may be used to indicate circumstances such as a memory copy.

If a data structure, as previously described, is produced for each memory update, there will quickly be a large graph of these structures. This graph represents all of the memory updates that have occurred over some time interval. Typically, there is no need to present the entire graph to the user at once. Instead, the user might enter a memory address to view the arcs leading up to the current content of memory at that user-specified address. The view, at that point, might look like a tree of nodes, fanning out into past memory updates. The user might then click on the nodes to inspect the call chain and source code for each node. The user would presumably be using embodiments of the invention in tandem with a debugger, which would help the user to derive relevant memory addresses to be historically analyzed.

There are situations when a value in memory is loaded into a register, retained there for awhile, and then written back out to memory, perhaps with some modification. Embodiments of the invention may store a set of these update data structures in thread-local storage (TLS), one for each register. The structure in TLS shall have its pointers to previous update structures filled in when the associated register is loaded. Two pointers to stackframes may also be stored in the update data structure in TLS to address this scenario. These pointers may include a first pointer for when a register is loaded from memory, and a second pointer for when it's stored (e.g., when memory if updated). The stackframe pointer corresponding to the memory update itself may be preferred for display, though there may be situations where the second stackframe pointer (representing the register load) may be useful for display as well.

While the preferred embodiment to the invention has been displayed, it will be understood that those skilled in the art, both now and in the future, may make various improvements and enhancements which fall within the scope of the claims which follow. These claims should be construed to maintain the proper protection for the invention first described.

What is claimed is:

1. An automated method for historical analysis of a memory state, comprising:
   tracking all memory write accesses by an application under test;
   recording a directed graph having values in a plurality of memory locations, such values being derived from values previously stored in at least one of, (i) the same memory location, and (ii) another memory location, each memory location being updated by a computer operation occurring at a verifiable time;
   displaying a portion of the graph that led to the update of a user-specified memory location by the application under test; and
   traversing backward from any node located on the directed graph via an arc utilized to follow the path of events that led to the content of the memory location represented by that node at the time represented by that node, displaying the arc so that one end of the displayed arc ends at the node representing the user-specified first memory location and the other end of the displayed arc ends at another node representing a second memory location whose value was utilized during the computation of the value presently stored in the user-specified memory location;
   wherein the node representing the second memory location is expandable to reveal information about how data was acquired and redistributed from the second memory location to the first memory location;
   wherein when each memory location is updated a core data structure is allocated and utilized to represent the update, wherein the core data structure includes (i) the memory address being updated, (ii) an instruction pointer for the code that is updating that address, (iii) a pointer to a previous memory update structure representing a precursor to this update, (iiii) a second pointer to a previous update structure in case the update involves two values previously stored in memory, (iv) a time stamp, and (v) a link to the structure representing the update that has occurred immediately prior to this update in time.

2. The method of claim 1, wherein each node is further expandable to reveal a call chain of the executed computer instruction that led to the update of the memory location associated with that node.

3. The method of claim 2, wherein each node is further expandable to reveal the executed computer instruction that led to the update of the memory location associated with that node.

4. The method of claim 3, wherein the second memory location is updated by a computer operation occurring at a verifiable time.

5. The method of claim 4, wherein the call chain is a plurality of linked stackframes.

6. The method of claim 5, wherein a stackframe is a data structure that represents a position in a call graph.

* * * * *